US012766653B2

(12) United States Patent
Buffoli

(10) Patent No.: US 12,766,653 B2
(45) Date of Patent: Oct. 20, 2026

(54) APPARATUS AND METHOD FOR MANUFACTURING LOCK CYLINDERS

(71) Applicant: Buffoli Transfer S.p.A., Brescia BS (IT)

(72) Inventor: Edoardo Buffoli, Brescia BS (IT)

(73) Assignee: BUFFOLI TRANSFER S.P.A., Brescia BS (IT)

( * ) Notice: Subject to any disclaimer, the term of this patent is extended or adjusted under 35 U.S.C. 154(b) by 311 days.

(21) Appl. No.: 18/581,516

(22) Filed: Feb. 20, 2024

(65) Prior Publication Data

US 2024/0278365 A1 Aug. 22, 2024

(30) Foreign Application Priority Data

Feb. 20, 2023 (IT) ........................ 102023000002865

(51) Int. Cl.
*B25B 27/00* (2006.01)
*B23Q 3/06* (2006.01)
(Continued)

(52) U.S. Cl.
CPC ............... *B23Q 3/062* (2013.01); *B23Q 5/34* (2013.01); *B23Q 7/04* (2013.01)

(58) Field of Classification Search
CPC . B23Q 3/062; B23Q 3/06; B23Q 3/00; B23Q 3/12; B23P 19/00; B23P 19/04; B23P 19/008
See application file for complete search history.

(56) References Cited

U.S. PATENT DOCUMENTS

| | | | | |
|---|---|---|---|---|
| 3,895,424 A | 7/1975 | Hautau | | |
| 6,644,637 B1 * | 11/2003 | Shen | B25B 5/061 269/152 | |

(Continued)

FOREIGN PATENT DOCUMENTS

| | | | |
|---|---|---|---|
| CN | 113579754 A | 11/2021 | |
| DE | 19529071 A1 | 2/1997 | |
| DE | 102014106915 A1 | 11/2015 | |

OTHER PUBLICATIONS

Italian Search Report for Corresponding International Application No. IT 202300002865, 8 pages, Aug. 4, 2023.

*Primary Examiner* — Lee D Wilson
(74) *Attorney, Agent, or Firm* — LUCAS & MERCANTI, LLP

(57) ABSTRACT

The present invention relates to an apparatus for machining lock cylinders. It includes a first operating group having a machining station and a repositioning station, and a second operating group having a gripping station configured to grip and release a workpiece. The gripping station supports a workpiece in a first machining configuration, for performing a first machining operation thereon, and in a second machining configuration, for performing a second machining operation thereon. The second configuration is different from the first machining configuration to expose different parts of the workpiece to the machining station following repositioning of the workpiece between the first and second configurations. The gripping station is configured to reposition the workpiece between the first machining configuration and the second machining configuration. A method for machining lock cylinders is also disclosed.

13 Claims, 2 Drawing Sheets

(51) Int. Cl.
*B23Q 5/34* (2006.01)
*B23Q 7/04* (2006.01)

(56) References Cited

U.S. PATENT DOCUMENTS

| | | | | |
|---|---|---|---|---|
| 7,618,028 | B2 * | 11/2009 | Huisken | B23Q 3/062 269/63 |
| 8,292,282 | B2 * | 10/2012 | Gao | B62D 65/10 269/27 |
| 8,523,156 | B2 * | 9/2013 | Hou | B25B 5/10 269/37 |
| 8,985,564 | B2 * | 3/2015 | Stanifer | B23Q 3/069 269/45 |
| 2013/0106042 | A1 * | 5/2013 | Gao | B62D 65/026 269/289 R |
| 2024/0278365 | A1 * | 8/2024 | Buffoli | B23Q 3/062 |

* cited by examiner

APPARATUS AND METHOD FOR MANUFACTURING LOCK CYLINDERS

CROSS-REFERENCE TO RELATED APPLICATIONS

This application claims the benefit of priority from Italian Patent Application Ser. No. 102023000002865 filed on Feb. 20, 2023, the disclosure of which is incorporated herein by reference.

FIELD OF THE INVENTION

The present invention relates to an apparatus for machining lock cylinders. Moreover, the present invention describes a method for machining lock cylinders.

BACKGROUND OF THE INVENTION

Machines for machining products or semi-finished products which require precise machining are known. Said machines are configured such that they comprise a gripping element, which keeps the workpiece stationary, and one or more tools which may carry out on the workpiece a series of machining operations, such as machining with stock removal.

According to the prior art it is known to obtain lock cylinders which have precise tolerances. However the machines according to the prior art also have a number of limitations and drawbacks.

One drawback of these machines consists in the fact that the machinable surfaces of the cylinders are exclusively those which are exposed to the tools, it being therefore difficult to machine the surfaces which are not available to the tools.

In particular, the surfaces gripped by the gripping elements cannot reached by the tools and may be machined only subsequently. Namely, the workpieces must be removed from the machine and then mounted again on the same machine or on another machine which is equipped to perform the subsequent machining steps.

These operations may require time, therefore reducing the productivity of the machine, and are difficult to automate.

SUMMARY OF THE INVENTION

The problem underlying the present invention is therefore that of providing an apparatus for machining lock cylinders able to overcome the drawbacks of the known machines.

In the context of this task, one object of the invention is to provide an apparatus able to perform more efficiently the machining of lock cylinders. Yet another object of the present invention is that of providing an apparatus which is highly automated.

This task, as well as these and other objects which will appear more clearly below, are achieved by an apparatus and a method for machining lock cylinders according to the attached independent claims.

In particular, according to the present invention, an apparatus for machining lock cylinders comprising a first operating group and a second operating group is provided. The first operating group comprises first stations which comprise at least one machining station and a repositioning station. The second operating group comprises at least one gripping station configured to grip and release a workpiece.

The at least one gripping station is configured to support a workpiece alternately in a first machining configuration, for performing at least one first machining operation thereon, and in a second machining configuration, for performing at least one second machining operation thereon. Moreover, the second configuration is different from the first machining configuration so as to expose to the at least one machining station different parts of the workpiece following a repositioning of the workpiece between the first configuration and the second configuration.

In particular, the repositioning station is configured to reposition the workpiece between the first machining configuration and the second machining configuration.

In the context of the present disclosure "first or second machining operation" is understood as meaning any machining operation carried out on the workpiece in the first machining configuration or second machining configuration, respectively. In other words, "first or second machining operation" is not understood as meaning a specific machining operation, but any machining operation which is carried out in the respective machining configuration. Therefore, the first or second machining operation may be understood as meaning any machining operations which are the same or different from each other.

Furthermore, the repositioning station comprises a first repositioning body and a second repositioning body. In particular, the first repositioning body is configured to perform, in sequence, the following:

- remove the workpiece from the gripping station, which releases it;
- move the workpiece so as to make it available for gripping by the second repositioning body.

Moreover, the second repositioning body is configured to perform, in sequence, the following:

- grip the workpiece supported by the first repositioning body, which releases it;
- transfer the workpiece into a position in which the workpiece is available for gripping by the gripping station.

Namely, the apparatus allows machining of a workpiece positioned or configured in the first machining configuration and in the second machining configuration, different from the first configuration, owing to the presence of the repositioning station which allows movement of the workpiece between the first machining configuration and the second machining configuration. In particular, the repositioning station may pick up the workpiece from the gripping station, by means of the first repositioning body, and reposition the workpiece in the gripping station in the second machining configuration, by means of the second repositioning body.

More specifically, the second repositioning body may grip the workpiece from the first repositioning body, after the first repositioning body has picked up the workpiece from the gripping station in the first machining configuration. Thereafter, the second repositioning body may grip the workpiece from the first repositioning body and reposition the workpiece in the gripping station in the second machining configuration. In particular, preferably the first repositioning body is configured to move the workpiece so as to switch it from the first machining configuration into the second machining configuration.

Namely, the gripping station may grip or support a workpiece in a first machining configuration, so as to allow a first machining operation, performed for example by the at least one machining station, and the gripping station may also grip or support the workpiece in a second machining configuration, so as to allow a second machining operation, performed for example by the at least one machining station. This is possible following the repositioning of the workpiece by the repositioning station, in particular by the first repositioning body and the second repositioning body.

The first repositioning body may in fact pick up the workpiece from the gripping station in the first machining configuration, for example following a first machining operation, and may also rotate the workpiece so as to cause it to assume the second machining configuration. The second repositioning body may then grip the workpiece in the second machining configuration from the first repositioning body and may make it available for gripping by the gripping station, for example so as to allow a second machining operation.

According to the present invention a method for machining lock cylinders by means of the same apparatus is also provided, the method comprising the following steps:

- gripping of the workpiece by the at least one gripping station, so that the workpiece is in the first machining configuration;
- first machining of the workpiece in the first machining configuration by the at least one machining station;
- gripping of the workpiece, by the repositioning station, from the at least one gripping station, which releases it;
- rotation through a working angle of the workpiece by the repositioning station;
- gripping of the workpiece by the at least one gripping station in the second machining configuration, different from the first configuration;
- second machining of the workpiece in the second machining configuration by the at least one machining station.

Furthermore, the repositioning station comprises a first repositioning body and a second repositioning body. In particular, the first repositioning body performs in sequence the following steps:

- removing the workpiece from the gripping station, which releases it;
- moving the workpiece so as to make it available for gripping by the second repositioning body.

Moreover, the second repositioning body performs in sequence the following steps:

- gripping the workpiece supported by the first repositioning body, which releases it;
- transferring the workpiece into a position in which the workpiece is available for gripping by the gripping station.

In other words, the repositioning station comprises a first repositioning body configured at least to grip the workpiece from the gripping station, for example when it is in the first machining configuration, and to move the workpiece, for example from the first machining configuration to the second machining configuration. The repositioning station further comprises a second repositioning body configured to grip the workpiece from the first repositioning body and to make the workpiece available for gripping again by the gripping station, for example in the second machining configuration.

Detailed characteristic features of the apparatus and the method according to the invention are contained in the dependent claims.

Further characteristic features and advantages will emerge more clearly from the description of a preferred, but non-exclusive embodiment of the apparatus and the method according to the invention, with the aid of the drawings provided by way of a non-limiting example in the attached illustrations and listed below.

DETAILED DESCRIPTION

Figure 1:
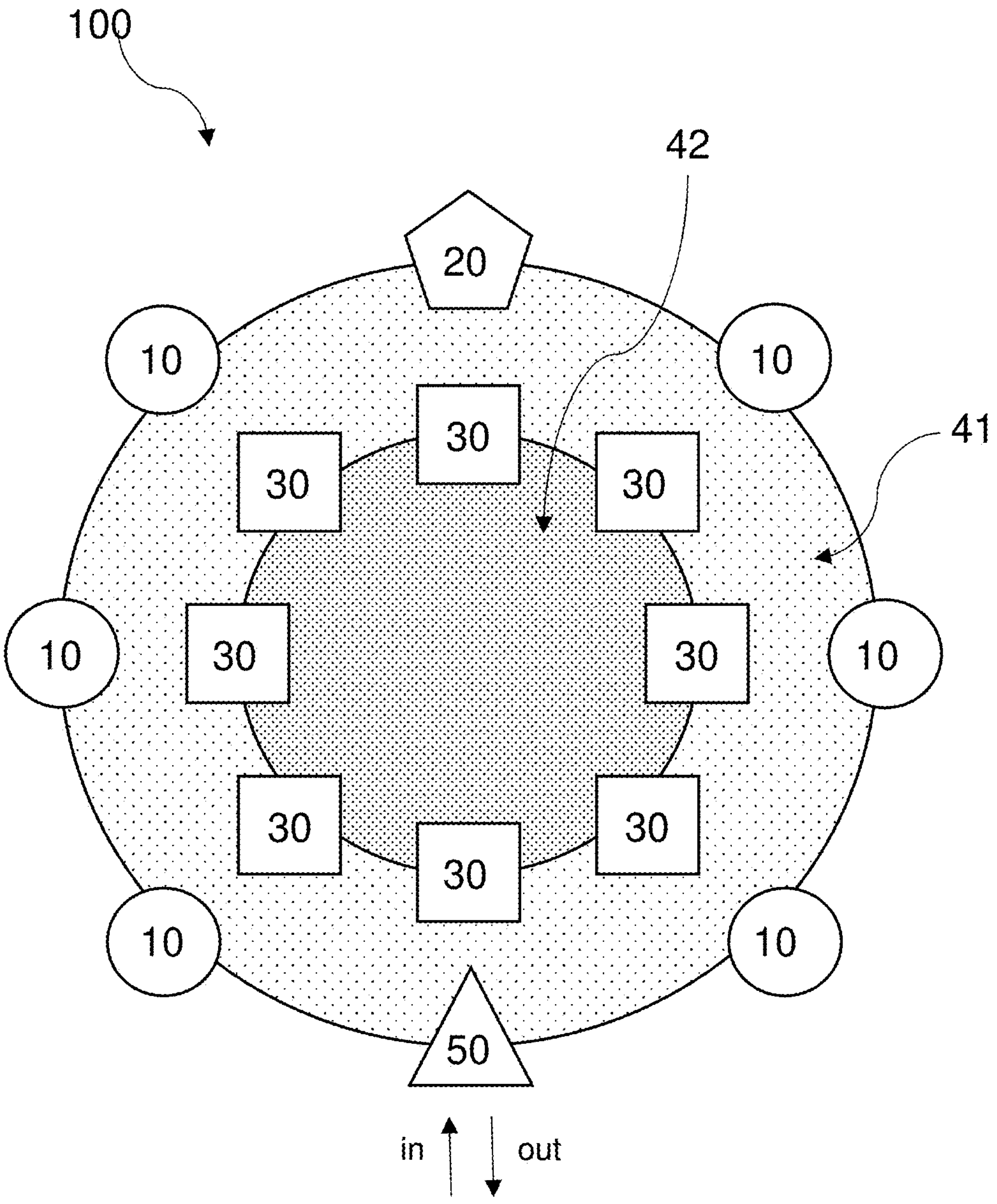
FIG. 1 shows a diagram of an apparatus according to an embodiment of the present invention.
Figure 2A:
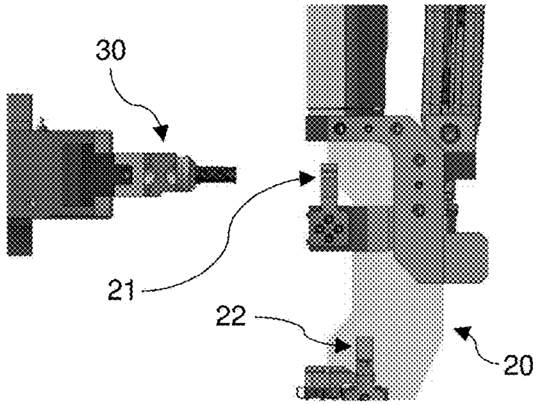
FIGS. 2A, 2B, 2C, 2D, 2F, 2E show a sequence for repositioning of a workpiece from the first machining configuration into the second machining configuration, in an embodiment of the apparatus according to the present invention.
Figure 2B:
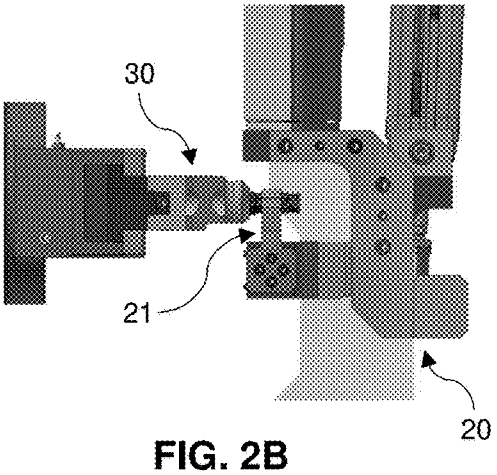
Figure 2C:
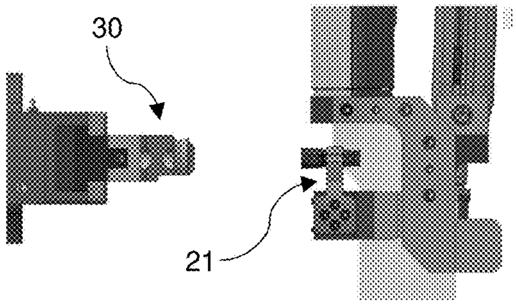
Figure 2D:
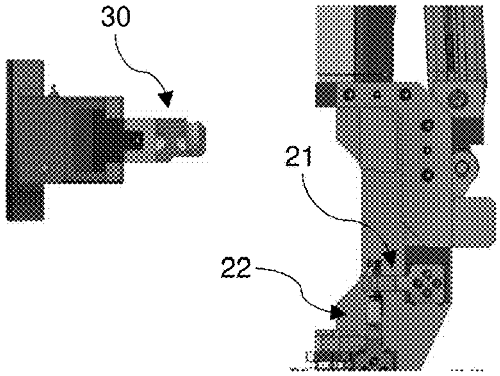
Figure 2E:
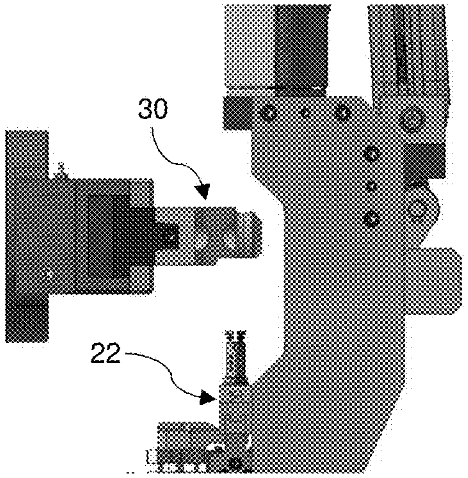
Figure 2F:
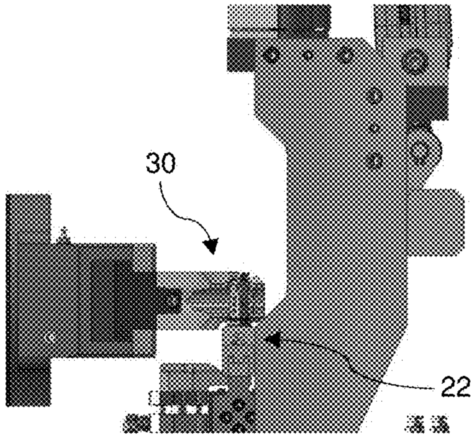

With particular reference to the said figures, 100 denotes overall an apparatus for machining lock cylinders, comprising a first operating group and a second operating group. The first operating group comprises first stations which comprise at least one machining station 10 and a repositioning station 20, and the second 25 operating group comprises at least one gripping station 30 configured to grip and release a workpiece.

In particular, the gripping station 30 is configured to support a workpiece alternately in a first machining configuration, for performing at least one first machining operation thereon, and in a second machining configuration, for performing at least one second machining operation thereon, where the second configuration is different from the first machining configuration so as to expose to the at least one machining station 10 different parts of the workpiece, following repositioning of the workpiece between the first configuration and the second configuration.

In particular, the repositioning station 20 is configured to reposition the workpiece between the first machining configuration and the second machining 5 configuration.

Preferably, the first operating group comprises a first support 41 (indicated schematically in FIG. 1), and the at least one machining station 10 and the repositioning station 20 are fixed to the first support 41.

Moreover, preferably the second operating group comprises a second support 42, and the at least one gripping station 30 is fixed to the second support 42|(indicated schematically in FIG. 1).

Even more preferably, the apparatus 100 defines a main operating axis around which the support 42 is rotatable so that the first stations face the at least one gripping station 30. For example, the gripping station 30 may rotate together with the second support 42 so to move the workpiece into the proximity of the at least one machining station 10 and the repositioning station 20, where it may be respectively machined or repositioned.

Alternatively, the apparatus may define a main operating direction along which the first support 41 and/or the second support 42 are movable so that the first stations face the at least one gripping station 30. Namely, the apparatus may be configured also along a linear direction, i.e. operating along a linear or straight direction along which the first stations and/or the at least one gripping station are arranged.

Below a rotatable configuration of the apparatus, i.e. a configuration rotatable about a main operating axis as described above, will be regarded as preferred. However, a linear configuration is to be regarded as an alternative embodiment which is effective for resolving the technical problem defined above and therefore it also forms the subject of the present invention.

Preferably, the at least one gripping station comprises a first seat and a second seat, where the first seat is configured to support the workpiece in the first machining configuration, while the second seat is configured to support the workpiece in the second machining configuration.

Preferably, the second operating group comprises the second support 42 and the gripping station 30 is supported by the second support 42 rotatably around a spindle axis. In particular, a workpiece gripped by the gripping station is rotatable around the spindle axis so as to expose different portions of the workpiece to the at least one machining station 10, following a rotation of the gripping station 30.

In other words, a workpiece gripped by the gripping station 30 may be rotated by the latter around the spindle axis, for example during the first or second machining operations, so as to allow the at least one machining station to machine one or more given portions of the surface of the workpiece. The workpiece may rotated around the spindle axis also so as to favour gripping by the repositioning station 20.

According to the invention, the repositioning station 20 comprises a first repositioning body 21 and a second repositioning body 22. In particular, as can be seen in FIGS. 2A to 2E, the first repositioning body 21 is configured to perform, in sequence, the following:

- remove the workpiece from the gripping station, which releases it;
- move the workpiece so as to make it available for gripping by the second repositioning body 22.

Moreover, the second repositioning body 22 is configured to perform, in sequence, the following:

- grip the workpiece supported by the first repositioning body 21, which releases it;
- transfer the workpiece into a position in which the workpiece is available for gripping by the gripping station 30.

In other words, the first repositioning body 21 is configured to remove the workpiece from the gripping station 30, preferably from the first seat of the gripping station 30, and then to move it, making it available for gripping by the second repositioning body 22. The latter is configured to grip the workpiece from the first repositioning body 21 and to transfer it to the gripping station 30, preferably into the second seat of the gripping station 30.

Namely, the second repositioning body 22 may move the workpiece into the proximity of the second gripping station 30 which may then grip it from the second repositioning body 22, which releases it.

Preferably, the first repositioning body is configured to grip the workpiece in the first machining configuration, for example following a first machining operation, and preferably to move it, for example rotate it through a working angle, from the first machining configuration into the second machining configuration.

Preferably, therefore, the second repositioning body is configured to grip the workpiece in the second machining configuration and to make it available for gripping by the gripping station, so as to allow for example a second machining operation on the workpiece once it has been gripped by the gripping station.

Preferably, the first repositioning body 21 is configured to rotate through a working angle, preferably 90°, the workpiece gripped during its movement.

Preferably, the at least one machining station 10 is configured to perform the at least one first machining operation which comprises the formation of a reference surface on the workpiece.

In particular, the gripping station 30 has a reference abutment designed to interfere with the reference surface of the workpiece so as to define a precise relative position of the workpiece with respect to the gripping station 30.

Moreover, preferably the repositioning station 20 can be operated so as to transfer the workpiece, provided with a reference surface, into the gripping station 30 so that the reference surface interferes with the reference abutment.

Preferably, the at least one machining station 10 comprises at least one interchangeable tool. Namely, the at least one machining station 10 may comprise more than one tool for performing machining operations and the tools may perform a plurality of machining operations on the workpiece.

Preferably, the first stations of the first operating group comprise a plurality of machining stations 10 and a repositioning station 20, and moreover the second operating group comprises a plurality of gripping stations 30.

Preferably, the first stations are organized so as to each face forwards, namely opposite one of the gripping stations 30. In this way each of the machining stations 10 may perform one or more machining operations on the workpiece gripped by one of the gripping stations 30, and then the gripping station 30 may move towards the following machining station 10. Moreover, the gripping station 30 may move towards the repositioning station 20 which may reposition the workpiece from the first machining configuration into the second machining configuration.

Preferably the plurality of gripping stations 30 are arranged in a circular arrangement and the plurality of machining stations 10 are arranged in a circular arrangement around said gripping stations. Moreover, preferably the repositioning station 20 is interposed between two adjacent machining stations 10.

Preferably, one of the second operating group and the first operating group is configured to be able to move relative to the other one so as to expose each of the plurality of gripping stations 30 to each of the plurality of machining stations 10 and to the repositioning station 20. In this particularly advantageous embodiment, each of the plurality of machining stations 10 performs either the first machining operation or the second machining operation following a movement of the second operating group or the first operating group, while the repositioning station 20 performs gripping and rotation through a working angle following a movement of the second operating group or the first operating group.

Preferably, the first stations further comprise a loading station and an unloading station or a loading/unloading station 50.

The present disclosure also relates to a method for machining lock cylinders by means of an apparatus 100 according to one of the embodiments described above. In particular, the apparatus comprises a first operating group, comprising at least one machining station 10 and a repositioning station 20, and a second operating group comprising at least one gripping station 30.

In particular, the method comprises the following steps:

- gripping of a workpiece by the at least one gripping station 30, in such a way that the workpiece is in a first machining configuration;
- machining of the workpiece by means of a first machining operation performed in the first machining configuration by the at least one machining station 10;
- gripping of the workpiece, by the repositioning station 20, from the at least one gripping station 30, which releases it;
- rotation, through a working angle, of the workpiece by the repositioning station 20;
- gripping of the workpiece by the at least one gripping station 30 in a second machining configuration different from the first configuration;
- further machining of the workpiece by means of a second machining operation in the second machining configuration by the at least one machining station 10;

Preferably, the first operating group comprises a plurality of machining stations 10 and a repositioning station 20, each fixed to a first support 41, and the second operating group comprises a plurality of gripping stations 20, each fixed to a second support 42.

Preferably, the second support 42 is configured to be able to move relative to the first support 41 in such a way as to expose each of the gripping stations 20 to each of the machining stations 10 and to the repositioning station 20.

In particular, each of the machining stations 10 may perform the first machining operation or the second machining operation following a movement of the second support 42 with respect to the first support 41, and the repositioning station 20 may perform the gripping and the rotation, through a working angle, of the workpiece following a movement of the second support 42.

Namely, for example, the second support 42 may rotate around a main operating axis of the apparatus 100 in such a way that each of the gripping stations 30 faces in sequence each of the machining stations 10 and the repositioning station 20, which are fixed to the fixed support 41 which is preferably stationary or configured to remain stationary.

In other words, in order to obtain an apparatus which is particularly compact and has a high productivity, it is possible to organize the apparatus 100 in a rotating configuration, in which either one of the first support or the second support 42 is rotatable around the main operating axis of the apparatus so that the first stations face the gripping stations 30.

Preferably, therefore, each gripping station 30 is moved so that a workpiece faces a first portion of the machining stations 10 in order to perform the first machining operations, then it is moved so that a workpiece faces the repositioning station, which moves the workpiece between the first and second machining configurations, and finally each gripping station 30 is moved so that the workpiece faces a second portion of the machining stations 10 for performing the second machining operations.

Even more preferably, the workpiece may be initially made available to a gripping station 30, which grips it, by means of a loading station and the same workpiece may be removed from the gripping station at the end of the machining operations by means of an unloading station. Alternatively, both the aforementioned operations may be performed by a single loading and unloading station.

According to the invention, the repositioning station 20 comprises a first repositioning body 21 and a second repositioning body 22. In particular, the first repositioning body 21 performs in sequence the following steps:

- removing the workpiece from the gripping station 30, which releases it, for example when the workpiece is in the first machining configuration following a first machining operation;
- moving the workpiece so as to make it available for gripping by the second repositioning body 32.

For example, the first repositioning body 21 may rotate the workpiece from the first machining configuration into the second machining configuration.

Moreover, the second repositioning body 22 performs in sequence the following steps:

- gripping the workpiece supported by the first repositioning body 21, which releases it;
- transferring the workpiece into a position in which the workpiece is available for gripping by the gripping station 30.

For example, therefore the second repositioning body 22 may make available the workpiece in the second machining configuration for gripping by the gripping station 30, for example so as to allow a second machining operation.

Consequently, it is therefore possible to perform in a rapid and automated manner a first machining operation and a second machining operation on the workpiece owing to the repositioning station 20. For example, the second machining operation may machine the workpiece in one or more non-accessible zones of the workpiece when it is in the first machining configuration, or vice versa, owing to gripping by the gripping station 30.

Preferably, the first machining operation comprises the formation of a reference surface on the workpiece. Moreover, preferably the gripping station 30 has a reference abutment which interferes with the reference surface of a workpiece so as to define a precise relative position of the workpiece with respect to the gripping station 30. Moreover, preferably the repositioning station 20 is operated so as to transfer a workpiece, provided with the reference surface, into the gripping station 30 and in this position the reference surface interferes with or abuts against the reference abutment.

As a result, it is possible to maintain very precise automated machining of the workpiece, since the reference abutment ensures that the workpiece is situated at precise and predefined coordinates during machining thereof.

It can therefore be understood how an apparatus and a method according to the present invention are able to achieve the predefined task and objects.

In particular, the apparatus and the method according to the present invention, described in their preferred embodiments, allow more efficient and productive machining of lock cylinders than that taught by the prior art. Moreover, the apparatus and the method described may be easily automated.

The invention thus devised may be subject to numerous modifications and variations, all of which fall within the scope of protection of the attached claims. Moreover, all the details may be replaced by other technically equivalent elements.

Where the operational characteristics and the techniques mentioned in the following claims are followed by reference numbers or symbols, these reference numbers or symbols have been assigned with the sole purpose of facilitating understanding of the description and said claims and consequently they do not limit in any way the interpretation of each element which is identified, purely by way of example, by said reference numbers or symbols.

The invention claimed is:

1. An apparatus for machining lock cylinders comprising:

a first operating group comprising first stations which comprise a machining station and a repositioning station, each fixed to a first support, a second operating group comprising a gripping station configured to grip and release a workpiece, wherein said gripping station is configured to support alternately a workpiece in a first machining configuration, for performing a first machining operation thereon, and in a second machining configuration, for performing a second machining operation thereon, wherein said second configuration is different from said first machining configuration so as to expose to said machining station different parts of the workpiece following a repositioning of the workpiece between said first configuration and said second configuration;

wherein said repositioning station is configured to reposition said workpiece between said first machining configuration and said second machining configuration, and wherein said repositioning station comprises:

a first repositioning body and a second repositioning body, wherein said first repositioning body is configured to perform, in sequence, the following:

remove said workpiece from said gripping station, which releases said workpiece, move said workpiece so as to make said workpiece available for gripping by said second repositioning body;

wherein said second repositioning body is configured to perform, in sequence, the following:

grip said workpiece supported by said first repositioning body, which releases said workpiece;

transfer said workpiece into a position in which the workpiece is available for gripping by said gripping station; and wherein said first repositioning body is configured to rotate a workpiece gripped by said first repositioning body through a working angle.

2. The apparatus according to claim 1 where said second operating group comprises a second support, wherein said gripping station is supported by said second support in a rotatable manner around a spindle axis so that a workpiece gripped by said gripping station is rotatable around said spindle axis so as to expose different portions of said workpiece to said machining station following a rotation of said gripping station.

3. The apparatus according to claim 1, wherein said machining station is configured to perform said first machining operation which comprises the formation of a reference surface on the workpiece;

where said gripping station has a reference abutment able to interfere with the reference surface of a workpiece so as to define a precise relative position of the workpiece with respect to the gripping station;

where said repositioning station can be operated so as to transfer a workpiece, provided with a reference surface, into said gripping station so that the reference surface interferes with said reference abutment.

4. The apparatus according to claim 2, wherein said machining station is configured to perform said first machining operation which comprises the formation of a reference surface on the workpiece;

where said gripping station has a reference abutment able to interfere with the reference surface of a workpiece so as to define a precise relative position of the workpiece with respect to the gripping station;

where said repositioning station can be operated so as to transfer a workpiece, provided with a reference surface, into said gripping station so that the reference surface interferes with said reference abutment.

5. The apparatus according to claim 1, wherein said machining station comprises an interchangeable tool.

6. The apparatus according to claim 1, wherein said first stations comprise a plurality of machining stations and a repositioning station, and wherein said second operating group comprises a plurality of gripping stations.

7. The apparatus according to claim 6, wherein the plurality of gripping stations is arranged in a circular arrangement and the plurality of machining stations is arranged in a circular arrangement around said gripping stations, and wherein said repositioning station is interposed between two adjacent machining stations.

8. The apparatus according to claim 6, wherein one of said second operating group and said first operating group is configured to be able to move relative to the other one in such a way as to expose each of said plurality of gripping stations to each of said plurality of machining stations and to said repositioning station, in such a way that each of said plurality of machining stations carries out said first machining operation or said second machining operation following a movement of said second operating group or said first operating group, and in such a way that said repositioning station carries out said gripping and said rotation through a working angle following a movement of said second operating group or said first operating group.

9. The apparatus according to claim 1, wherein said first stations further comprise a loading station and an unloading station or a loading/unloading station.

10. A method for machining lock cylinders, comprising:

a)—gripping a workpiece by a gripping station, in such a way that said workpiece is in a first machining configuration;

b)—machining the workpiece by means of a first machining operation performed in the first machining configuration by a machining station;

c)—gripping of the workpiece, by a repositioning station, from said gripping station, which releases the workpiece;

d)—rotating said workpiece through a working angle by said repositioning station;

gripping of said workpiece by said gripping station in a second machining configuration, different from the first configuration;

further machining of the workpiece by means of a second machining operation performed in the second machining configuration by said machining station;

and wherein the repositioning station comprises:

a first repositioning body and a second repositioning body, wherein said first repositioning body performs in sequence the following steps:

removing said workpiece from said gripping station, which releases the workpiece;

moving said workpiece so as to make the workpiece it available for gripping by said second repositioning body;

and wherein said second repositioning body performs in sequence the following steps:

gripping said workpiece supported by said first repositioning body, which releases the workpiece; and transferring said workpiece into a position in which the workpiece is available for gripping by said gripping station.

11. The method according to claim 10, wherein said first operating group comprises a plurality of machining stations and a repositioning station, each fixed to a first support, and said second operating group comprises a plurality of gripping stations, each fixed to a first support, wherein one of said second operating group and said first operating group is configured to be able to move relative to the other group in such a way as to expose each of said plurality of gripping stations to each of said plurality of machining stations and to said repositioning station, and wherein each of said plurality of machining stations carries out said first machining operation or said second machining operation following a movement of said second operating group or said first operating group, and wherein said repositioning station carries out said gripping and said rotation through a working angle following a movement of said second operating group or said first operating group.

12. The method according to claim 10, wherein the first machining operation comprises the formation of a reference surface on the workpiece;

where said gripping station has a reference abutment which interferes with the reference surface of a workpiece so as to define a precise relative position of the workpiece with respect to the gripping station;

wherein said repositioning station is operated to transfer a workpiece, provided with the reference surface, into said gripping station and in said position the reference surface interferes with or abuts against said reference abutment.

13. The apparatus according to claim 1, wherein said working angle is 90°.

* * * * *